US010907869B2

(12) United States Patent
Hagh et al.

(10) Patent No.: US 10,907,869 B2
(45) Date of Patent: Feb. 2, 2021

(54) INTEGRATED VAPOR CYCLE AND PUMPED TWO-PHASE COOLING SYSTEM WITH LATENT THERMAL STORAGE OF REFRIGERANTS FOR TRANSIENT THERMAL MANAGEMENT

(71) Applicant: HONEYWELL INTERNATIONAL INC., Morris Plains, NJ (US)

(72) Inventors: Bijan F Hagh, Newport Beach, CA (US); Daguang Zheng, Torrance, CA (US); Joe Borghese, Yucca Valley, CA (US)

(73) Assignee: Honeywell International Inc., Charlotte, NC (US)

( * ) Notice: Subject to any disclaimer, the term of this patent is extended or adjusted under 35 U.S.C. 154(b) by 33 days.

(21) Appl. No.: 16/048,632

(22) Filed: Jul. 30, 2018

(65) Prior Publication Data

US 2019/0360730 A1   Nov. 28, 2019

Related U.S. Application Data

(60) Provisional application No. 62/675,878, filed on May 24, 2018.

(51) Int. Cl.
| | |
|---|---|
| *F25B 40/02* | (2006.01) |
| *F25B 5/02* | (2006.01) |
| *F25B 40/06* | (2006.01) |
| *F25B 41/04* | (2006.01) |
| *F25B 49/02* | (2006.01) |

(52) U.S. Cl.
CPC ............... *F25B 40/02* (2013.01); *F25B 5/02* (2013.01); *F25B 40/06* (2013.01); *F25B 41/043* (2013.01); *F25B 49/02* (2013.01); *F25B 2339/02* (2013.01); *F25B 2400/13* (2013.01); *F25B 2400/23* (2013.01); *F25B 2400/24* (2013.01)

(58) Field of Classification Search
CPC .......... F25B 40/02; F25B 5/02; F25B 41/043; F25B 2339/02; F25B 2400/13; F25B 2400/0419; F25B 2400/0409; F25B 2400/23
See application file for complete search history.

(56) References Cited

U.S. PATENT DOCUMENTS

| | | | |
|---|---|---|---|
| 7,644,593 | B2 | 1/2010 | Duraisamy |
| 8,959,937 | B2 | 2/2015 | Piesker |
| 9,797,637 | B2 | 10/2017 | Shimazu |

(Continued)

OTHER PUBLICATIONS

Wu, "Experimental Evaluation and Control of Two-Phase Multi-Microchannel Evaporator Cooling Systems for High Efficiency Data Center", These No. 5588 (2012).

(Continued)

*Primary Examiner* — Marc E Norman
*Assistant Examiner* — Schyler S Sanks
(74) *Attorney, Agent, or Firm* — Shumaker & Sieffert, P.A.

(57) ABSTRACT

A cooling system uses refrigerants for two-phase cooling and thermal energy storage for a transient heat source. The cooling system includes a flash tank downstream of a heat load to be cooled. A subcooler/super-heater is downstream of the flash tank. A compressor is downstream of the subcooler/super-heater. A condenser is downstream of the compressor and upstream of the flash tank.

19 Claims, 6 Drawing Sheets

(56) References Cited

U.S. PATENT DOCUMENTS

| | | | | |
|---|---|---|---|---|
| 2008/0236179 A1* | 10/2008 | Ignatiev | ............. | F04C 29/0014 |
| | | | | 62/190 |
| 2009/0025405 A1* | 1/2009 | Yanik | ..................... | F25B 40/00 |
| | | | | 62/117 |
| 2012/0103005 A1* | 5/2012 | Kopko | ..................... | F25B 1/10 |
| | | | | 62/430 |
| 2014/0013782 A1* | 1/2014 | Kopko | .................. | A63B 57/00 |
| | | | | 62/115 |

OTHER PUBLICATIONS

Advanced Cooling Technologies, Inc., "Pumped Two Phase Cooling Solutions for Challenging Thermal Management Applications" Thermal News, Jan. 19, 2015.

* cited by examiner

INTEGRATED VAPOR CYCLE AND PUMPED TWO-PHASE COOLING SYSTEM WITH LATENT THERMAL STORAGE OF REFRIGERANTS FOR TRANSIENT THERMAL MANAGEMENT

CROSS-REFERENCE TO RELATED APPLICATIONS

This application claims the benefit of and priority to U.S. provisional application No. 62/675,878, filed May 24, 2018, which is incorporated herein in its entirety.

BACKGROUND OF THE INVENTION

The present invention generally relates to two-phase cooling and, more particularly, to apparatus and methods of two-phase cooling with thermal storage.

Transient or cyclic heat loads, such as laser diodes, require managing large heat fluxes in a relatively short period of time within narrow temperature limits. This requires high recirculating flowrates for coolants that use sensible heat for cooling. It is also known that the flowrate of coolant can be greatly reduced and a more precise temperature control achieved if latent heat of vaporization of a recirculating refrigerant is used for cooling.

These cooling systems usually require thermal lift to a heat sink at ambient temperature which can be achieved with a vapor cycle system (VCS) using refrigerants. The size of VCS can be reduced by introduction of yet another loop for thermal storage to buffer maximum heat loads for a cyclical system. Such a system typically uses sensible heat of coolants such as water, propylene glycol, combinations of water and propylene glycol, polyalphaolefin (PAO) or fuel or latent heat of Phase Change Materials (PCMs) such as wax or ice. For cooling systems with thermal storage, the VCS is sized to meet the recovery time required for the duty cycle of the transient heat load. Thermal energy storage typically uses a heat exchanger to remove heat from the cooling loop and typically includes hot/cold tanks, pumps, valves and piping for thermal storage. The size of hot/cold storage tanks can be minimized by pre-chilling coolant to a temperature below heat load but this approach increases power consumption for the VCS due to higher thermal lift.

Figure 1:
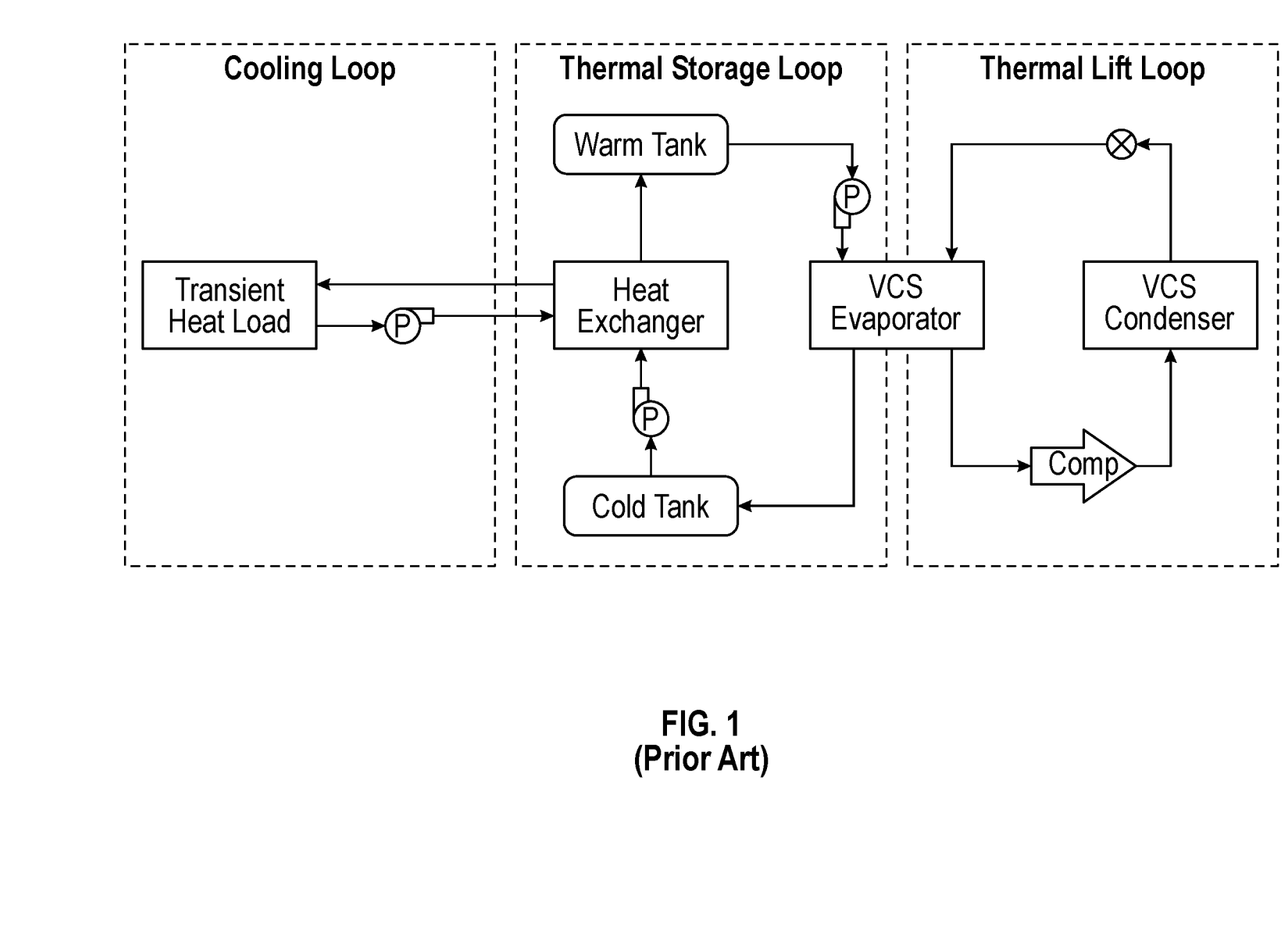
FIG. 1 is a schematic diagram of a thermal management system of the prior art.

FIG. 1 shows a typical thermal management system for a high heat flux load consisting of three cascaded loops consisting of cooling loop, thermal energy storage loop, and thermal lift loop. Such a system is typically heavy and bulky, and requires significant start-up time due to sequential pull down of three thermal loops across at least two heat exchangers. Under some conditions, the VCS will have to be upsized beyond what is required by the duty cycle to meet the start-up time requirement during hot days.

Figure 2:
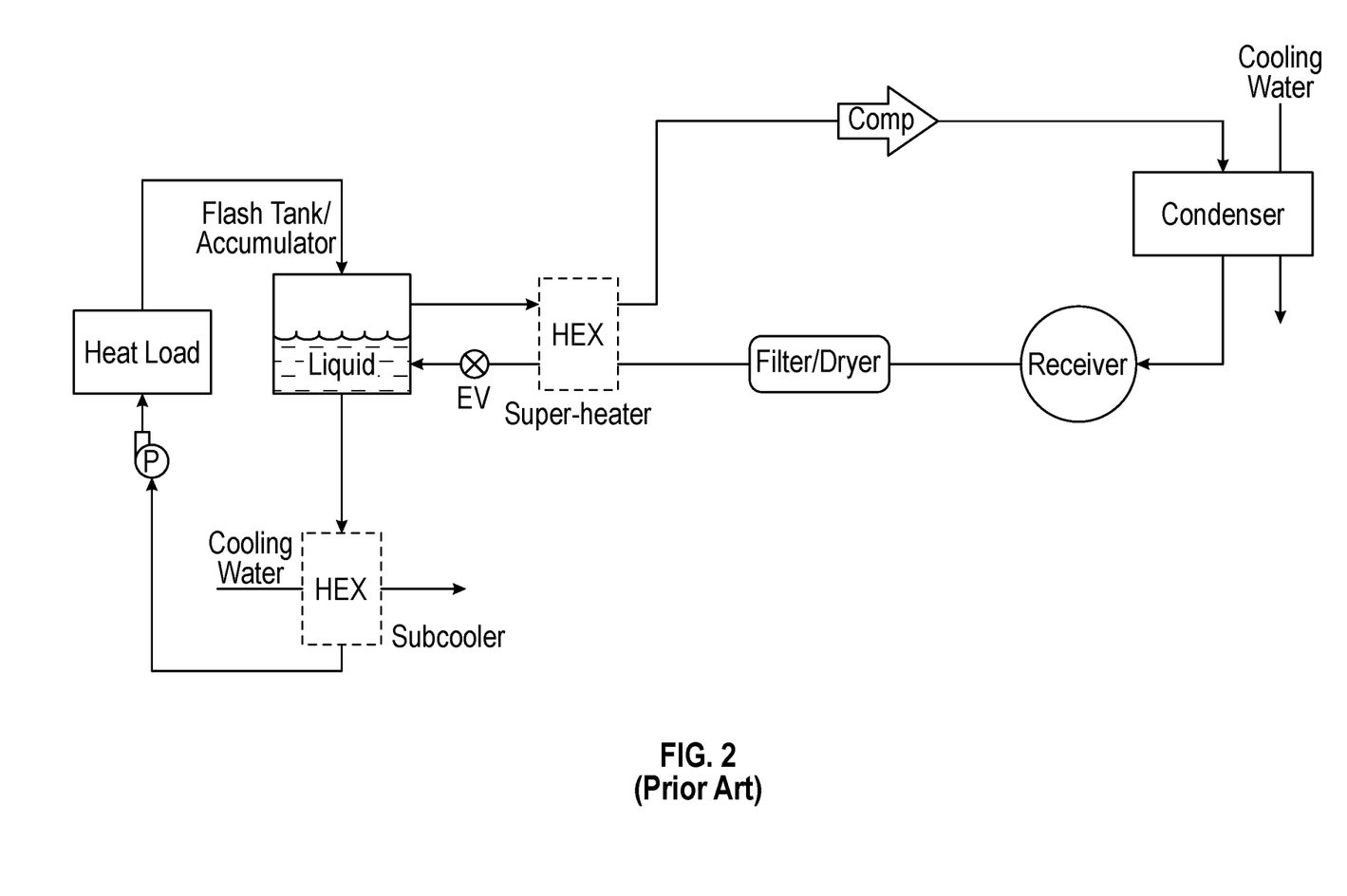
FIG. 2 is a schematic diagram of another thermal management system of the prior art.

FIG. 2 is another prior thermal management system and shows that a flash tank acts as a combined evaporator/accumulator for the VCS with R-134a as common fluid in conjunction with a compressor and a pump (both oil-less). This shows that heat removal in the order of hundreds of watts can be accomplished by keeping constant pressure in the condenser and flash tank. Refrigerant exits flash tank at or near saturated conditions and an external heat sink such as a chilled water loop is required to provide subcooling at the pump to prevent cavitation. The requirement for a heat sink at temperatures below the heat load defeats the purpose of the thermal lift loop and makes this system bulky and inefficient for heat sources with higher heat loads such as laser diodes.

As can be seen, there is a need for improved apparatus and methods for two-phase cooling and thermal energy storage for transient heat loads.

SUMMARY OF THE INVENTION

In one aspect of the present invention, a cooling system comprises a flash tank downstream of a heat load to be cooled; a subcooler/super-heater downstream of the flash tank; a compressor downstream of the subcooler/super-heater; and a condenser downstream of the compressor and upstream of the flash tank.

In another aspect of the present invention, a cooling system comprises a flash tank downstream of a heat load to be cooled; a subcooler/super-heater downstream of the flash tank; a regenerative heat exchanger downstream of the subcooler/super-heater; a compressor downstream of the subcooler/super-heater; and a condenser downstream of the compressor and upstream of the flash tank.

In a further aspect of the present invention, a cooling system comprises a flash tank downstream of a heat load to be cooled; a subcooler/super-heater downstream of the flash tank; a non-regenerative heat exchanger downstream of the subcooler/super-heater; a compressor downstream of the subcooler/super-heater; and a condenser downstream of the compressor and upstream of the flash tank.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Herein, a "subcooler" is intended to mean a device that provides subcooling to a liquid by reducing temperature to below its saturation temperature at a particular pressure.

Herein, "subcooled", "subcooling" and the like are intended to mean that if a temperature of a liquid is lower than its saturation temperature at a particular pressure, it is a subcooled liquid.

Herein, a "superheater" is intended to mean a device that provides superheating to a vapor by increasing temperature to above its saturation temperature at a particular pressure.

Herein, "superheat", "superheated" and the like are intended to mean that if a temperature of a vapor is higher than its saturation temperature at a particular pressure, it is a superheated vapor.

Broadly, the present invention provides apparatus and methods for a cooling system which uses refrigerants for two-phase cooling and thermal energy storage for a transient heat source. Furthermore, the present invention integrates a superheater and a subcooler in a single heat exchanger and eliminates external heat sink for subcooling at a pump inlet. This invention is robust with respect to heat source and can provide cooling for steady or transient heat loads. When heating in an evaporator and cooling in a condenser are balanced, the pressure and level of refrigerant in a flash tank will remain constant. If heating exceeds cooling, the pressure will rise and the level of refrigerant will drop with time. If cooling is higher than heating, the pressure will decrease and the level of refrigerant will increase with time.

In the present invention, for a transient heat load, compressor and pump (both oil-less) can have variable speed. The condenser can be operated at constant or variable pressure by manipulating compressor speed and/or an EV-1 expansion valve opening. The variable speed pump can be adjusted to ensure adequate heat removal and some superheat at the outlet of the evaporator in order to properly measure the fluid state for control purposes. An EV-2 expansion valve can be adjusted to ensure adequate subcooling at pump inlet. It may be advantageous to replace one or both expansion valves with orifices to simplify the system. The choice of refrigerant is based on allowed pressure drop for system components, leakage requirements, as well as required temperatures at the evaporator and condenser.

In embodiments, a bypass valve is added to inject high pressure superheated refrigerant from an evaporator outlet. This ensures superheating at a compressor inlet independent of an EV-2 opening which can be adjusted to ensure adequate subcooling at a pump inlet.

At evaporator temperatures consistent with electronic or optical loads, the system components (e.g., evaporator, condenser, subcooler-superheater) may be fabricated from aluminum, compact plate fin heat exchangers.

Figure 3:
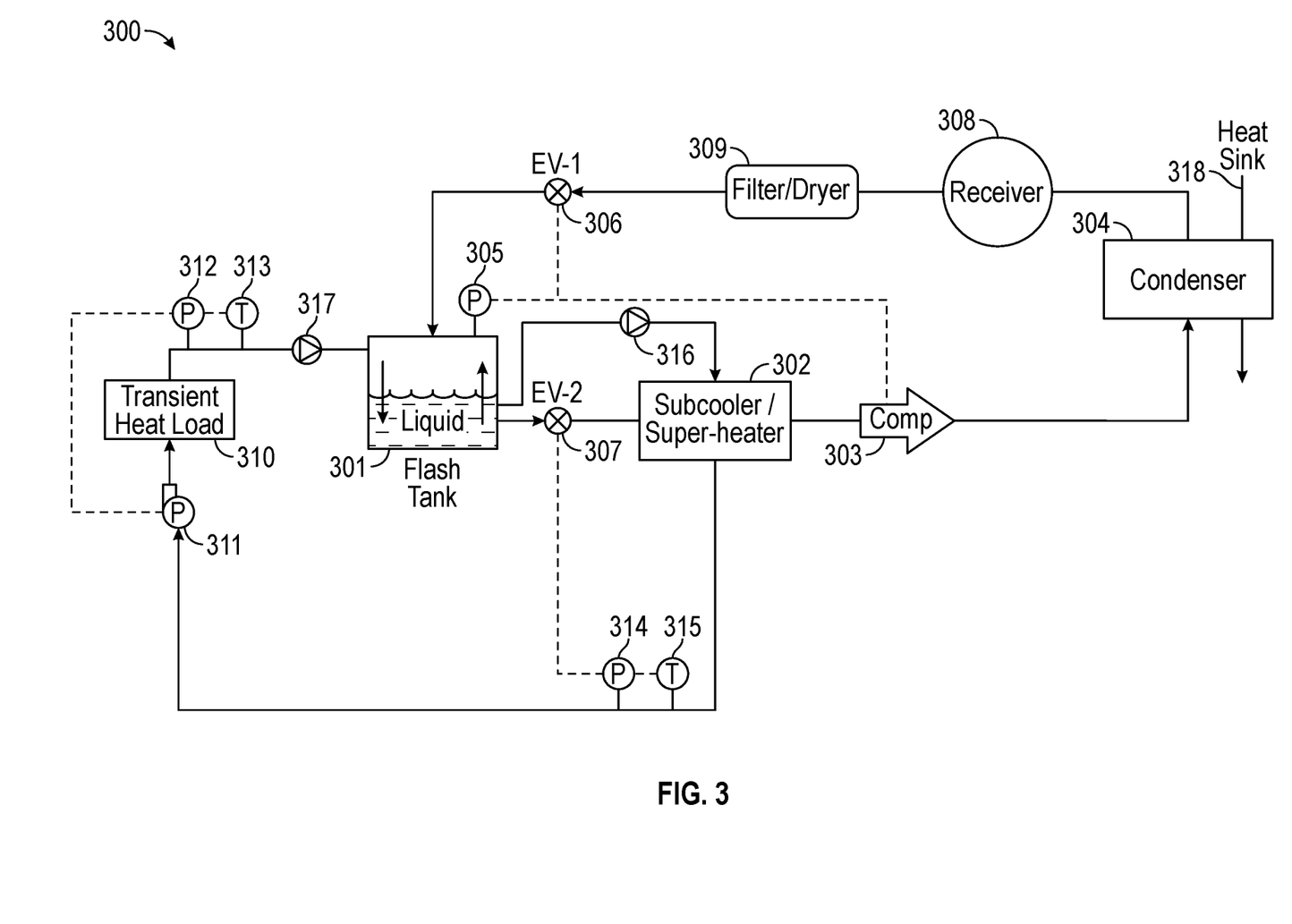
FIG. 3 is a schematic diagram of a cooling system according to an embodiment of the present invention.

FIG. 3 is a schematic diagram of a thermal management (i.e., cooling) system 300 according to an exemplary embodiment of the present invention. The system 300 may include a flash tank 301 that is configured to receive/hold/discharge a liquid refrigerant, a vapor refrigerant, and a liquid-vapor refrigerant. The flash tank 301 may be directly downstream of a transient heat load 310 (e.g., electronics) to be cooled by the system 300. Alternatively, the flash tank 301 may be indirectly downstream of the transient heat load 310, such as when a check valve 317 is therebetween. Also, between the flash tank 301 and the transient heat load 310, a pressure sensor 312 and a temperature sensor 313 may be used to adjust operation of a variable speed pump 311 to ensure adequate heat removal and some superheat at the outlet of the transient heat load 310.

A subcooler/super-heater 302 may be downstream of the flash tank 301. The subcooler/super-heater 302 may be configured to cool liquid refrigerant from the flash tank 301, as well as heat vapor refrigerant from an expansion valve (EV-2) 307.

The subcooler/super-heater 302 may be indirectly downstream of the flash tank 301 whereby the expansion valve (EV-2) 307 may be disposed therebetween to receive liquid refrigerant from the flash tank 301, and discharge a mixture of vapor and liquid refrigerant at lower pressure to the subcooler/super-heater 302.

In addition, the subcooler/super-heater 302 may be indirectly downstream of the flash tank 301 whereby a check valve 316 may be disposed therebetween to receive liquid refrigerant from the flash tank 301 and discharge the same to the subcooler/super-heater 302.

A compressor 303 may be directly downstream of the subcooler/super-heater 302. The compressor 303 may receive vapor refrigerant from the subcooler/super-heater 302 and raise the pressure/temperature of the same.

A pressure sensor 305 may be configured to measure pressure in the flash tank 301. The pressure sensor 305 may be used to control compressor 303 and/or EV-1 expansion valve 306 to maintain pressure in the flash tank 301 within acceptable limits.

A condenser 304 may also be directly downstream of the compressor 303 and may be configured to receive/condense vapor refrigerant from the compressor and discharge a sub-cooled liquid refrigerant. The condenser 304 may do so by placing the vapor refrigerant in heat exchange with a heat sink 318, such as a fan air or water.

A receiver 308 may be directly downstream of the condenser 304 and may be configured to store liquid refrigerant. A filter/dryer 309 may be directly downstream of the receiver 308 and may be configured to remove debris and humidity from the liquid refrigerant. An expansion valve (EV-1) 306 may be directly downstream of the filter/dryer 309 and may be configured to discharge a mixture of vapor and liquid refrigerant at lower pressure to the flash tank 301.

As noted above, liquid refrigerant from the subcooler/super-heater 302 may flow to a directly downstream pump 311. Between the subcooler/super-heater 302 and the pump 311, a pressure sensor 314 and a temperature sensor 315 may be used to control EV-2 expansion valve 307 to ensure adequate subcooling at inlet of the pump 311.

Figure 4:
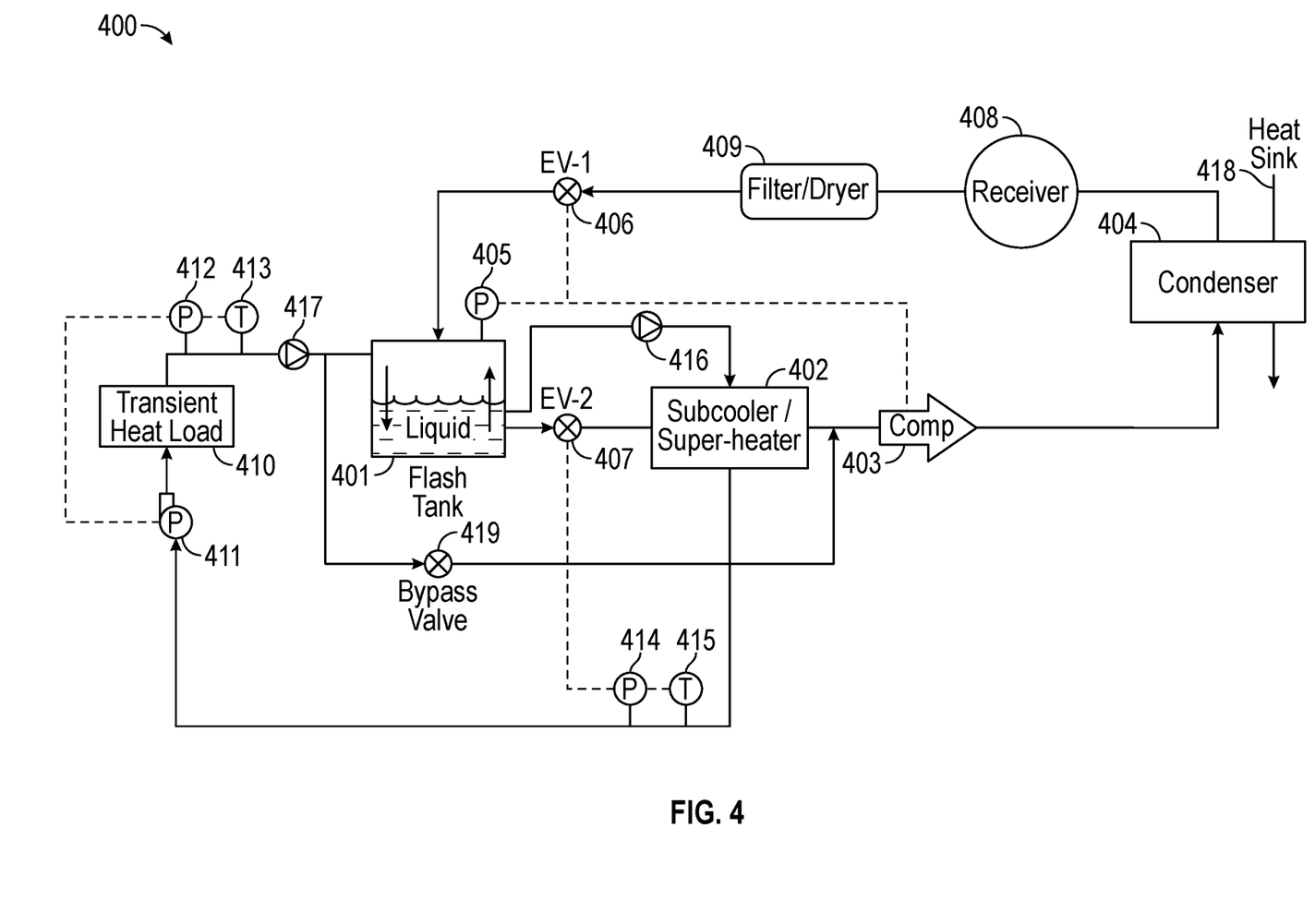
FIG. 4 is a schematic diagram of a cooling system according to another embodiment of the present invention.

FIG. 4 is a schematic diagram of a thermal management (i.e., cooling) system 400 according to another embodiment of the present invention. The system 400 may be similar to that described in relation to FIG. 3. Accordingly, reference numbers in FIG. 4 correspond to like reference numbers in FIG. 3.

In contrast to FIG. 3, the system 400 in FIG. 4 may include a bypass valve 419 to inject high pressure refrigerant from the outlet of transient heat load 410. This allows higher load capability and superheating at a compressor 403 inlet independent of an EV-2 expansion valve 407 opening.

Figure 5:
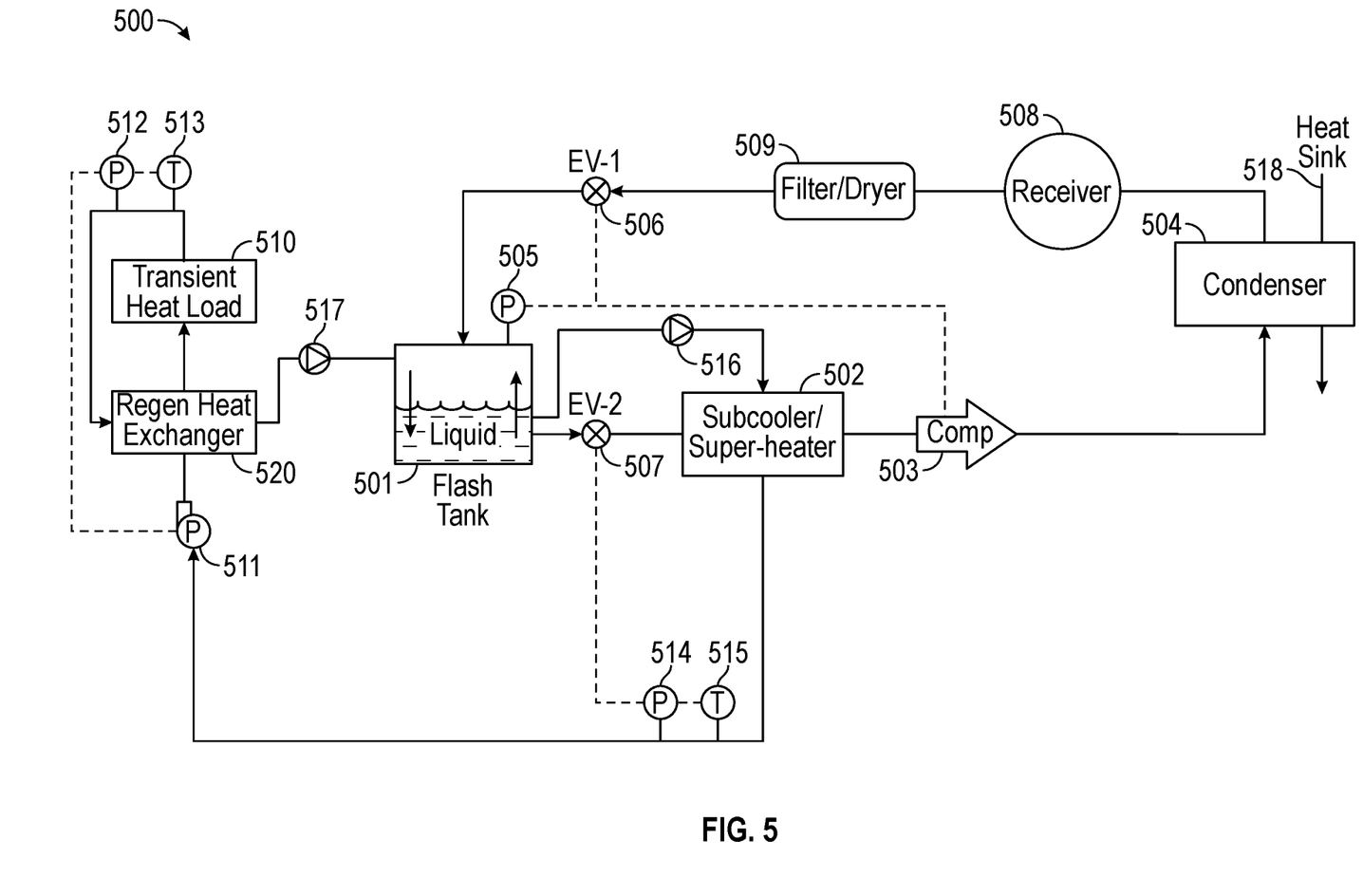
FIG. 5 is a schematic diagram of a cooling system according to still another embodiment of the present invention.

FIG. 5 is a schematic diagram of a thermal management (i.e., cooling) system 500 according to another embodiment of the present invention. The system 500 may be similar to that described in relation to FIG. 3. Accordingly, reference numbers in FIG. 5 correspond to like reference numbers in FIG. 3.

In contrast to FIG. 3, the system 500 in FIG. 5 may include a regenerative heat exchanger 520 disposed between a pump 511 and a transient heat load 510. A superheated refrigerant may discharge from the transient heat load and enter the hot-side of the regenerative heat exchanger 520 and then discharge to the flash tank 501. A subcooled liquid refrigerant may discharge from the pump 511 and enter the cold-side of the regenerative heat exchanger 520 and then supply cooling to the transient heat load 510. Thereby, the regenerative heat exchanger 520 can function to reduce the amount of subcooling that needs to be removed in the heat load 510 which may help with more uniform temperatures within heat load 510. The regenerative heat exchanger 520 can also function to remove some superheat from discharge of the transient heat load to reduce pressure increase in the flash tank 501.

Figure 6:
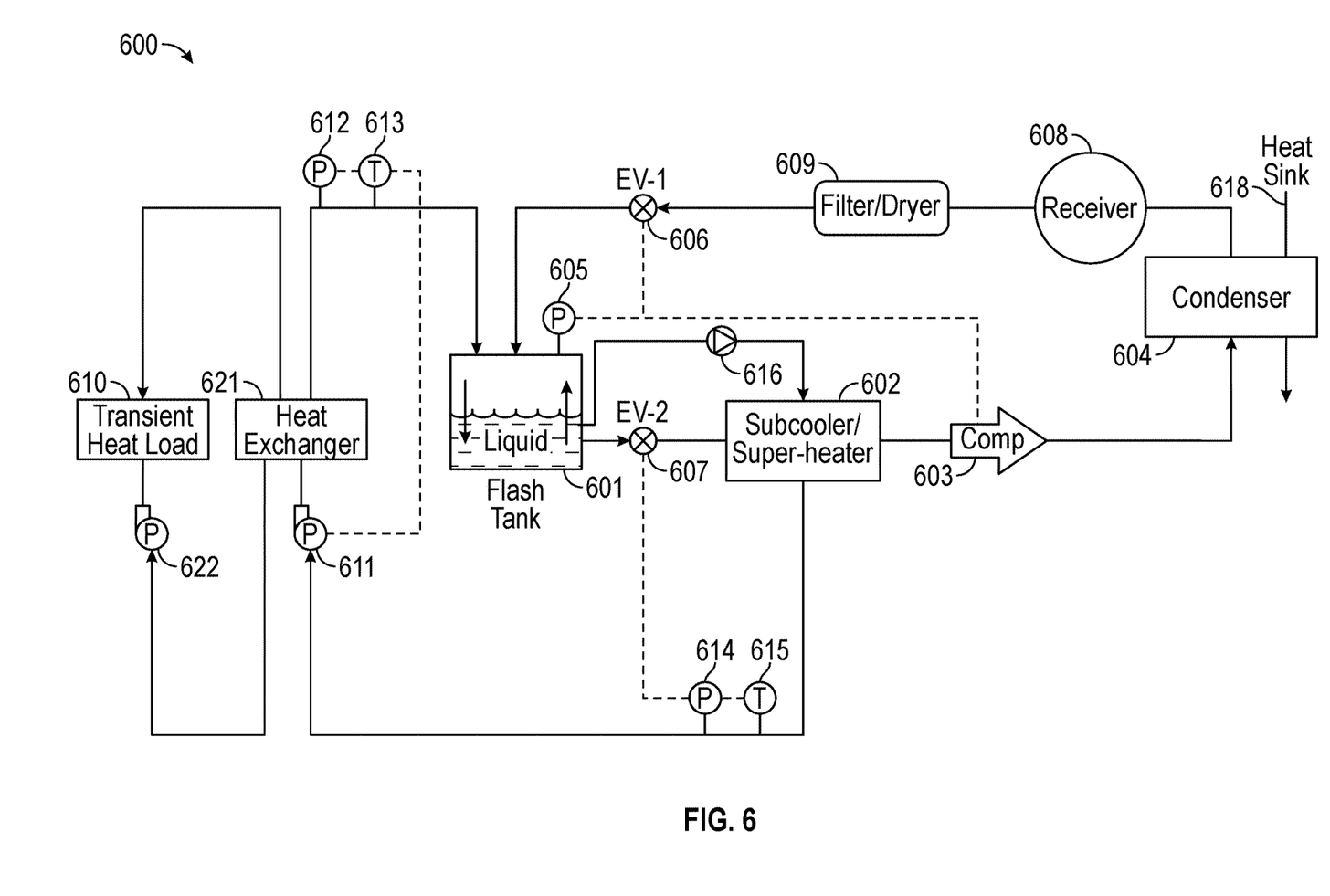
FIG. 6 is a schematic diagram of a cooling system according to a further embodiment of the present invention.

FIG. 6 is a schematic diagram of a thermal management (i.e., cooling) system 600 according to another embodiment of the present invention. The system 600 may be similar to that described in relation to FIGS. 3 and 5. Accordingly, reference numbers in FIG. 6 correspond to like reference numbers in FIGS. 3 and 5.

In contrast to FIGS. 3 and 5, the system 600 in FIG. 6 may include a non-regenerative heat exchanger 621 disposed between a pump 611 and a flash tank 601. A transient heat load 610 with a pump 622 are in a cooling loop separate from a thermal lift loop. The thermal lift loop can include the flash tank 601, the subcooler/super-heater 602, the compressor 603, and the condenser 604. The non-regenerative heat exchanger 621 is disposed in both the cooling loop and the thermal lift loop. Thereby, the heat exchanger 621 can function to transfer heat between the cooling and thermal lift loops. Furthermore, the heat exchanger 621 may enable usage of different coolants and/or refrigerants in the cooling and thermal lift loops. For example, the hot-side of non-regenerative heat exchanger 621 may receive a refrigerant or coolant that is different from the refrigerant in the cold-side of the non-regenerative heat exchanger 621.

Between the non-regenerative heat exchanger 621 and the flash tank 601, a pressure sensor 612 and a temperature sensor 613 may be used to control a variable speed pump 611 to ensure adequate heat removal and some superheat at the exit of the non-regenerative heat exchanger 621.

It should be understood, of course, that the foregoing relates to exemplary embodiments of the invention and that modifications may be made without departing from the spirit and scope of the invention as set forth in the following claims.

We claim:

1. A cooling system, comprising:
   a flash tank downstream of a heat load to be cooled;
   a subcooler and super-heater downstream of the flash tank;
   a compressor downstream of the subcooler and super-heater;
   a condenser downstream of the compressor and upstream of the flash tank;
   a bypass valve configured to inject high pressure refrigerant to the compressor from the heat load; and
   an expansion valve intermediate the flash tank and the subcooler and super-heater, the expansion valve configured to discharge a mixture of vapor and liquid refrigerant to the subcooler and super-heater,
   wherein the flash tank is configured to discharge liquid refrigerant to the expansion valve and the subcooler and super-heater.

2. The system of claim 1, wherein the flash tank is configured to receive a liquid refrigerant from the condenser.

3. The system of claim 1, wherein the subcooler and super-heater is upstream of the heat load.

4. The system of claim 1, wherein the expansion valve comprises a first expansion valve, and wherein the system further comprises a second expansion valve intermediate the condenser and the flash tank.

5. The system of claim 1, further comprising a pump intermediate the subcooler and super-heater and the heat load.

6. A cooling system, comprising:
   a flash tank downstream of a heat load to be cooled;
   a subcooler and super-heater downstream of the flash tank;
   a regenerative heat exchanger downstream of the subcooler and super-heater;
   a compressor downstream of the subcooler and super-heater;
   a condenser downstream of the compressor and upstream of the flash tank;
   a bypass valve configured to inject high pressure refrigerant to the compressor from the heat load; and
   an expansion valve intermediate the flash tank and the subcooler and super-heater, the expansion valve configured to discharge a mixture of vapor and liquid refrigerant to the subcooler and super-heater,
   wherein the flash tank is configured to discharge liquid refrigerant to the expansion valve and the subcooler and super-heater.

7. The system of claim 6, wherein the regenerative heat exchanger is directly upstream of the heat load.

8. The system of claim 6, wherein the regenerative heat exchanger is configured to receive a refrigerant discharge from the heat load.

9. The system of claim 6, wherein the regenerative heat exchanger is configured to discharge refrigerant directly to the flash tank.

10. The system of claim 6, wherein the regenerative heat exchanger is configured to discharge refrigerant indirectly, via a check valve, to the flash tank.

11. The system of claim 6, further comprising a pump intermediate the subcooler and super-heater and the regenerative heat exchanger.

12. A cooling system, comprising:
    a flash tank downstream of a heat load to be cooled;
    a subcooler and super-heater downstream of the flash tank;
    a non-regenerative heat exchanger downstream of the subcooler and super-heater;
    a compressor downstream of the subcooler and super-heater;
    a condenser downstream of the compressor and upstream of the flash tank;
    a bypass valve configured to inject high pressure refrigerant to the compressor from the heat load; and
    an expansion valve intermediate the flash tank and the subcooler and super-heater, the expansion valve configured to discharge a mixture of vapor and liquid refrigerant to the subcooler and super-heater,
    wherein the flash tank is configured to discharge liquid refrigerant to the expansion valve and the subcooler and super-heater.

13. The system of claim 12, wherein:
    the heat load is in a cooling loop and not in a thermal lift loop; and
    the non-regenerative heat exchanger is in both the cooling loop and the thermal lift loop.

14. The system of claim 12, wherein the non-regenerative heat exchanger is configured to receive a refrigerant discharge from the heat load.

15. The system of claim 12, wherein the non-regenerative heat exchanger is configured to receive a coolant discharge from the heat load.

16. The system of claim 12, wherein the non-regenerative heat exchanger is configured to discharge a refrigerant to the flash tank.

17. The system of claim 12, further comprising a pump intermediate the subcooler and super-heater and the non-regenerative heat exchanger.

18. The system of claim 1, wherein the subcooler and super-heater comprises a single heat exchanger.

19. The system of claim 1, wherein the subcooler and super-heater is configured to:
   cool the liquid refrigerant from the flash tank; and
   heat the vapor refrigerant from the expansion valve.

\* \* \* \* \*